United States Patent
Pinkus et al.

[11] Patent Number: 5,608,213
[45] Date of Patent: Mar. 4, 1997

[54] SPECTRAL DISTRIBUTION EMULATION

[75] Inventors: Alan R. Pinkus, Fairborn; Harry L. Task, Dayton, both of Ohio

[73] Assignee: The United States of America as represented by the Secretary of the Air Force, Washington, D.C.

[21] Appl. No.: 552,402

[22] Filed: Nov. 3, 1995

[51] Int. Cl.$^6$ ............................................. H04N 17/00
[52] U.S. Cl. .................... 250/252.1; 250/330; 250/495.1
[58] Field of Search ............................ 250/494.1, 495.1, 250/252.1 A, 330

[56] References Cited

U.S. PATENT DOCUMENTS

| | | | |
|---|---|---|---|
| 4,859,080 | 8/1989 | Titus et al. | 250/495.1 |
| 5,175,432 | 12/1992 | Reitman et al. | 250/332 |
| 5,237,173 | 8/1993 | Stark et al. | 250/252.1 |
| 5,251,006 | 10/1993 | Honigs et al. | 356/319 |
| 5,302,823 | 4/1994 | Franklin et al. | 250/252.1 |
| 5,302,824 | 4/1994 | Prager | 250/252.1 |
| 5,311,273 | 5/1994 | Tank et al. | 356/43 |
| 5,416,332 | 5/1995 | Chen et al. | 250/495.1 |

*Primary Examiner*—Carolyn E. Fields
*Attorney, Agent, or Firm*—Gerald B. Hollins; Thomas L. Kundert

[57] ABSTRACT

A test arrangement for assessing the spectral energy distribution-determined response of a night vision device or other electro-optical apparatus. The test arrangement provides a library of spectral energy-distributed test signals or input scenes which may be selected to represent for example typical or extreme conditions expected during field use of the tested night vision device. The test signals originate in an array of energy transducer devices such as light emitting diode elements with each such light emitting diode element proving a limited wavelength component of the wide band composite optical signal received at the input port of the night vision device. Each component signal is arranged to be controlled electrically in presence or absence and also controlled electrically in radiance or intensity according to the needs of the scene being presented; such control is provided by a manual controller or by a programmed digital computer or by other controlling apparatus such as a programmed logic array. The composite test signal may include both infrared and visible components. In addition to control of the composite test signal, other aspects of the performed test such as test scene data storage may also be accomplished in the controller or computer. The disclosed apparatus is especially suited to performance verification of night vision systems in a laboratory environment prior to field use of similar systems. Military and non-military uses are contemplated.

20 Claims, 4 Drawing Sheets

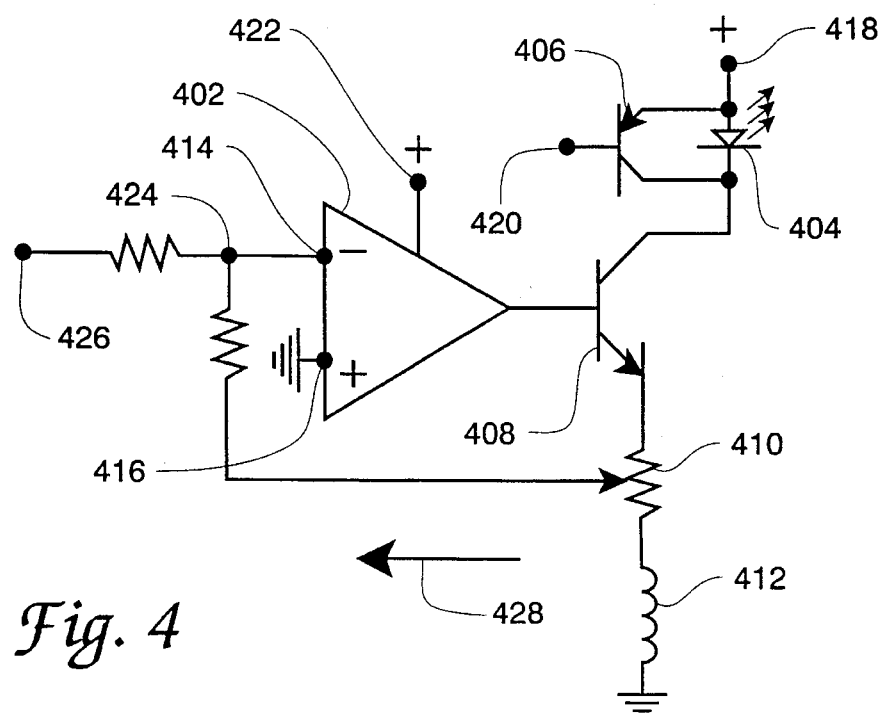
Fig. 4
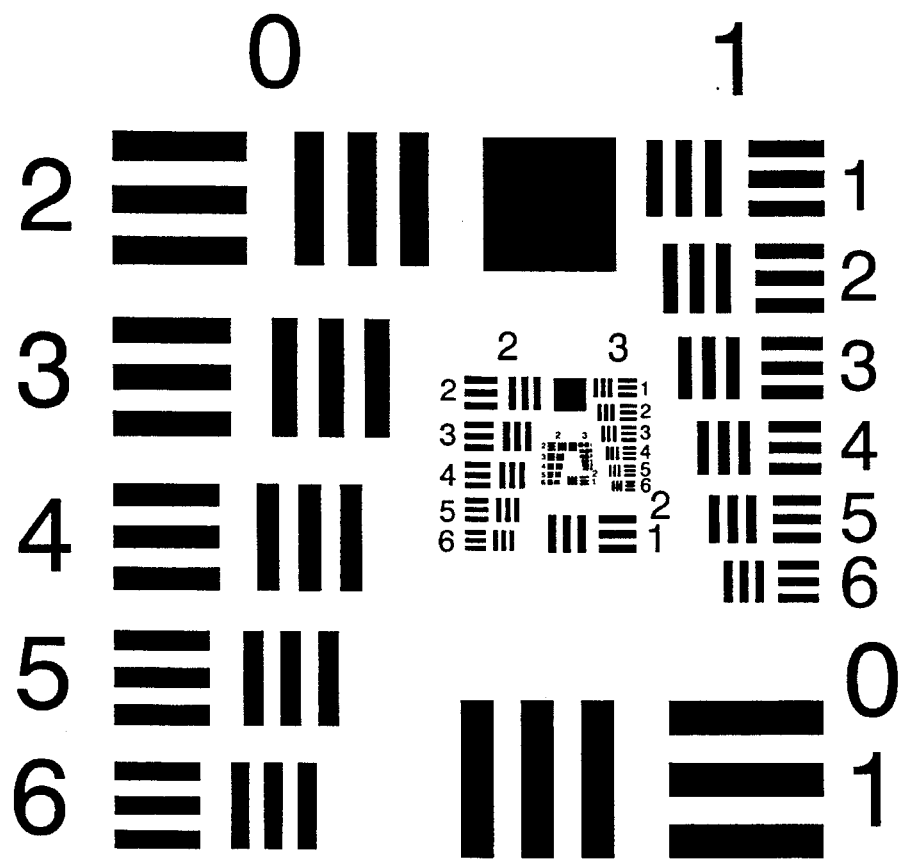
Fig. 6   PRIOR ART

SPECTRAL DISTRIBUTION EMULATION

RIGHTS OF THE GOVERNMENT

The invention described herein may be manufactured and used by or for the Government of the United States for all governmental purposes without the payment of any royalty.

BACKGROUND OF THE INVENTION

An object to be viewed by a night vision device is considered to either emit or reflect a particularly characteristic spectral energy distribution (SED) under each given set of surrounding environment conditions. Such a spectral energy distribution is often referred-to as the signature of the object, the signature with respect to night vision devices. Such spectral energy distribution characteristics of a target object or a target scene are often measured for analytical purposes on a wavelength by wavelength basis, using a scanning spectroradiometer system. The results of this measurement are often then combined with characteristics of the consideration to predict the performance of the system in response to that particular target or scene—a prediction therefore involving measurements desirably accomplished in the controlled conditions of a laboratory.

In view of this cumbersome procedure, precise laboratory tests of night vision devices and other electro-optical systems are often restricted to use of a limited number of calibration standards. Reconstructing the spectral energy distribution (for example the relevant colors where visible wavelengths are involved) of the large number of objects encountered in field use of a system has heretofore been considered to be very difficult since field-encountered objects can have complex spectral energy distributions that are not easy to reproduce. The present invention however emulates either of the emissive or reflective spectral energy distribution characteristics of a wide variety of objects for use in laboratory evaluations of several classes of electro-optical sensors, particularly night vision devices.

Formally of course the term "color" relates to wavelengths in the spectral range between 400 and 700 nanometers where the human eye is responsive. Since the present invention relates to night vision equipment having principal spectral response in the near-infrared region, the spectral range between 650 and 1000 nanometers of wavelength, many of the wavelength changes of present concern can be referred-to as "color" changes only in a generic sense. Nevertheless it is the intent of the invention to provide a rapidly achievable and accurate evaluation of the spectral energy distribution response of a night vision device to predictable inputs of differing spectral content.

The U.S. patent art indicates the presence of inventive activity in the field of night vision devices and their spectral energy distribution-related testing. One such patent is U.S. Pat. No. 5,200,622 issued to J. M. Rouchon et al, a patent which is concerned with an infrared observation system having a self-checking feature. The Rouchon patent uses the Narcissus effect parasitic image which is imposed on the useful image of an aircraft pod mounted or other infrared system to achieve the self checking feature. The Rouchon patent appears to be only distally related to the spectral energy distribution testing concept of the present invention, however.

The invention of R. D. Rosenthal in U.S. Pat. No. 4,969,115 is of general background interest with respect to the present invention in the sense that it discloses use of infrared spectrum energy to achieve quantitative measurements of organic samples and also an arrangement for determining the similarity of a sequence of these organic samples. The Rosenthal apparatus is however only distally, if at all, related to night vision equipment and its spectral energy distribution testing.

The additional invention of R. D. Rosenthal in U.S. Pat. No. 5,204,532 is also of general background interest with respect to the present invention in the sense that it discloses use of near-infrared spectral calibration standards, i.e. spectral clusters of known calibration constant, to achieve accurate calibration of a blood glucose measuring system. This Rosenthal apparatus is also however only distally, if at all, related to night vision equipment spectral energy distribution testing.

Similarly the patent of J. R. Apperson et al., U.S. Pat. No. 5,206,511, is of general background interest with respect to the present invention. The Apperson et al. patent discloses an arrangement for calibrating an infrared apparatus of the blood gas analyzer type, a device of the nature used in surgical operating rooms to measure a patient's breath gasses. This calibration is achieved in the above referred-to manner of using known standard elements which have predetermined numeric values of reflection or absorption. The Apperson et al. apparatus is however, also only distally, if at all, related to night vision equipment and its spectral energy distribution testing.

The invention of P. G. Morse in U.S. Pat. No. 4,965,448 is also of general background interest with respect to the present invention in the sense that it discloses use of a calibration standard in an infrared detector system. The Morse apparatus however also appears only distally, if at all, related to night vision equipment and its spectral energy distribution testing.

The invention of J. B. Sampsell et al. in U.S. Pat. No. 5,323,002 is also of interest with respect to the present invention, since it discloses use of a calibration arrangement in an optical system. In particular the Sampsell et al. system uses a spatial light modulator to achieve a desired mix of different temperature or different color-operated calibration sources. The Sampsell apparatus also discloses the use of a two or three point calibration arrangement, output to input calibration of an optical system and storage of a generated correction factor to correct the output to input calibration. The Sampsell et al. apparatus appears only distally related to night vision equipment and its spectral energy distribution testing.

The prior patent of one inventor named in the present patent document, U.S. Pat. No. 5,070,239, issued to A. R. Pinkus, is also of interest with respect to the present invention. This patent discloses a night vision device testing arrangement which includes an input signal source and a night vision device output measuring apparatus for evaluating the tested night vision device's response to this input signal. The Pinkus apparatus also appears only distally related to night vision equipment and its spectral energy distribution testing however.

Similarly the patent of E. N. Neigoff et al., U.S. Pat. No. 5,220,840, is also of general background interest with respect to the present invention. The Neigoff et al. patent discloses an arrangement for calibrating the lamps in an accelerated weathering or colorfastness testing apparatus. This calibration is achieved with irradiation measurements of individual lamps in the sample testing area in combination with feedback control of lamp input power adjustment. The Neigoff et al. apparatus is however, also only distally, if at all, related to night vision equipment and its and its spectral energy distribution testing.

Similarly the patent of L. V. Krusewski, U.S. Pat. No. 5,122,661, is of general background interest with respect to the present invention. The Krusewski patent discloses an arrangement for testing an infrared radiation detector of the type usable in steel mills and in testing electrical contacts for heat generated by high electrical resistance, a tester employing a light emitting diode scalar output display. The Krusewski apparatus is however, also only distally, if at all, related to night vision equipment and its spectral energy distribution testing.

Similarly the patent of V. Tank et al., U.S. Pat. No. 5,311,273, is of general background interest with respect to the present invention. The Tank patent discloses an arrangement for calibrating a spectral radiometer in the infrared range of the spectrum and in the presence of atmospheric effects. The Tank et al. patent also discloses the calibration of Fourier transform spectrometers by means of complex spectral inputs. The Tank et al. apparatus is however, also only distally, if at all, related to night vision equipment and its spectral energy distribution testing with precisely known signals in a laboratory environment.

Similarly the patent of William Reitmann et al., U.S. Pat. No. 5,175,432, is of general background interest with respect to the present invention. The Reitmann patent discloses an arrangement for testing an infrared detector of the type used in satellites, a test employing an optical scene test generator which provides a representative scene and a moving object. The Reitmann et al., patent also recites in column 3, the identity of several other United States patents involving infrared sensors and their testing. The Reitmann apparatus is however, also only distally related to night vision equipment and its spectral energy distribution testing with precisely known signals in a laboratory environment.

Similarly the patent of D. E. Honigs et al., U.S. Pat. No. 5,251,006, is of general background interest with respect to the present invention. The Honigs et al. patent discloses an arrangement for calibrating a spectrophotometer which uses an absorbance standard to recalibrate a set of instrument coefficients prior to each measurement made with the instrument. The Honigs spectrophotometer instrument is concerned with both reflection and transmission measurements made in the infrared and visible portions of the electromagnetic spectrum. The Honigs apparatus is however, also only distally, if at all, related to night vision equipment and its spectral energy distribution testing.

Similarly the patent of K. E. Prager, U.S. Pat. No. 5,302,824, is of general background interest with respect to the present invention. The Prager patent discloses an arrangement for compensating gain differences in the elements of an array of optical to electrical transducers, an arrangement involving mathematical averaging and storage of correction related values in a pair of memories. The Prager apparatus is however, also only distally, if at all, related to night vision equipment and its spectral energy distribution testing.

Similarly the patent of Ian Stark et al., U.S. Pat. No. 5,237,173, is of general background interest with respect to the present invention. The Stark et al., patent discloses an arrangement for calibrating the gain of transducer devices in a scintillation camera, an arrangement which employs a plurality of individually pulsed light emitting devices. The Stark apparatus is however, also only distally, if at all, related to night vision equipment and its spectral energy distribution testing.

Similarly the patent of William Franklin et al., U.S. Pat. No. 5,302,823, is of general background interest with respect to the present invention. The Franklin et al. patent discloses an off axis collimator arrangement for monitoring the performance of an optical radiometer, a radiometer used in a photoreconnaissance space satellite. The Franklin apparatus is however, also only distally, if at all, related to night vision equipment and its spectral energy distribution testing.

The contents of three copending United States patent documents involving various combinations of the inventors named in the present document are also concerned with night vision devices and their spectral response testing and may therefore be of general interest with respect to the present invention; these documents are identified with the titles and serial numbers of "Synthetic Color Night Vision", application Ser. No. 08/498,449; "Night Vision Device Automated Spectral Response Determination", application Ser. No. 08/491,390; and "Night Vision Device Wavelength Test Pattern", application Ser. No. 08/500,302; respectively. The contents of these documents is hereby incorporated by reference into the present patent document.

SUMMARY OF THE INVENTION

The present invention provides a stable and easily accessed source of signals for performing spectral energy distribution testing of a night vision device or other electro-optical apparatus. The invention provides a repeatable wide wavelength band of spectral energy distribution related signals representative of those encountered in night vision device field use conditions, signals which are especially useful in a laboratory setting or other pre-use night vision device environments.

It is an object of the present invention therefore, to provide for repeatable and precisely defined night vision device test signal generation.

It is another object of the invention to provide an emulator of the spectral energy distribution characteristics of emissive or reflective objects for use in laboratory evaluation of electro-optical sensors such as night vision goggles.

It is another object of the invention to provide a convenient night vision device spectral energy distribution testing arrangement.

It is another object of the invention to provide a spectral energy distribution testing apparatus which may be used in a variety of environments including the equipment evaluation, and equipment testing or maintenance, environments.

It is another object of the invention to provide a spectral energy distribution testing arrangement which affords selectable spectral range and spectral resolution capabilities.

It is another object of the invention to provide a spectral energy distribution testing arrangement which affords selectable signal radiance.

It is another object of the invention to provide a spectral energy distribution testing arrangement which may be used with a variety of night vision device configurations.

It is another object of the invention to provide a spectral energy distribution testing arrangement which may be used with a night vision goggle, a night vision periscope, a night vision telescope, a night vision gun sight, a night vision spotting scope, a night vision video camera, night vision binoculars, and helmet mounted night vision apparatus.

It is another object of the invention to provide a spectral energy distribution testing arrangement which can be fabricated from ordinary and readily available components.

It is another object of the invention to provide a spectral energy distribution response evaluation apparatus which provides a plurality of individual radiant energy sources.

It is another object of the invention to provide a spectral energy distribution testing arrangement which utilizes the stability, small size, physical ruggedness and other advantages of solid state electronic devices in its embodiment.

It is another object of the invention to provide a spectral energy distribution testing arrangement which employs the convenience of computer-accomplished control and storage of several different spectral energy distribution test arrangements.

It is another object of the invention to provide a spectral energy distribution testing arrangement which is useful in performing realistic evaluations of night vision systems prior to testing in the field.

It is another object of the invention to provide a spectral energy distribution testing arrangement which is both convenient and of realistic characteristics as a night vision device test signal source.

It is another object of the invention to provide a spectral energy distribution testing arrangement which can be conveniently used in evaluating the effect of optical filters, aircraft windshields, aircraft visors, aircraft transparencies and other look-through objects with respect to night vision device performance.

Additional objects and features of the invention will be understood from the following description and claims and the accompanying drawings.

These and other objects of the invention are achieved by the method of verifying spectral energy distribution-determined performance of a night vision device comprising the steps of:

forming an array of electrical energy to optical energy transducer elements comprising elements within an input spectral energy distribution band of said night vision device;

generating a night vision device test input signal with energized of said array-comprised electrical energy to optical energy transducer elements, said test input signal including optical energy from array-included transducer elements of selected optical energy output wavelength and radiance level;

controlling said test input signal wavelength selection and radiance level selection by electrically determining one of an illuminated state and a quiescent state for, and an electrical energization level of, each electrical to optical energy transducer element in said array;

exposing an optical input port of said night vision device to said test input signal from said energized array-comprised electrical energy to optical energy transducer elements; and comparing an output signal of said night vision device, in response to said input port test input signal exposure, with an expected night vision device output signal for said spectral energy distribution input.

BRIEF DESCRIPTION OF THE DRAWINGS

FIG. 4 shows an electrical circuit which may be used to control individual elements in the FIG. 3 transducer array.

FId. 5 shows a flow diagram for software which may be used in the invention.

Figure 1:
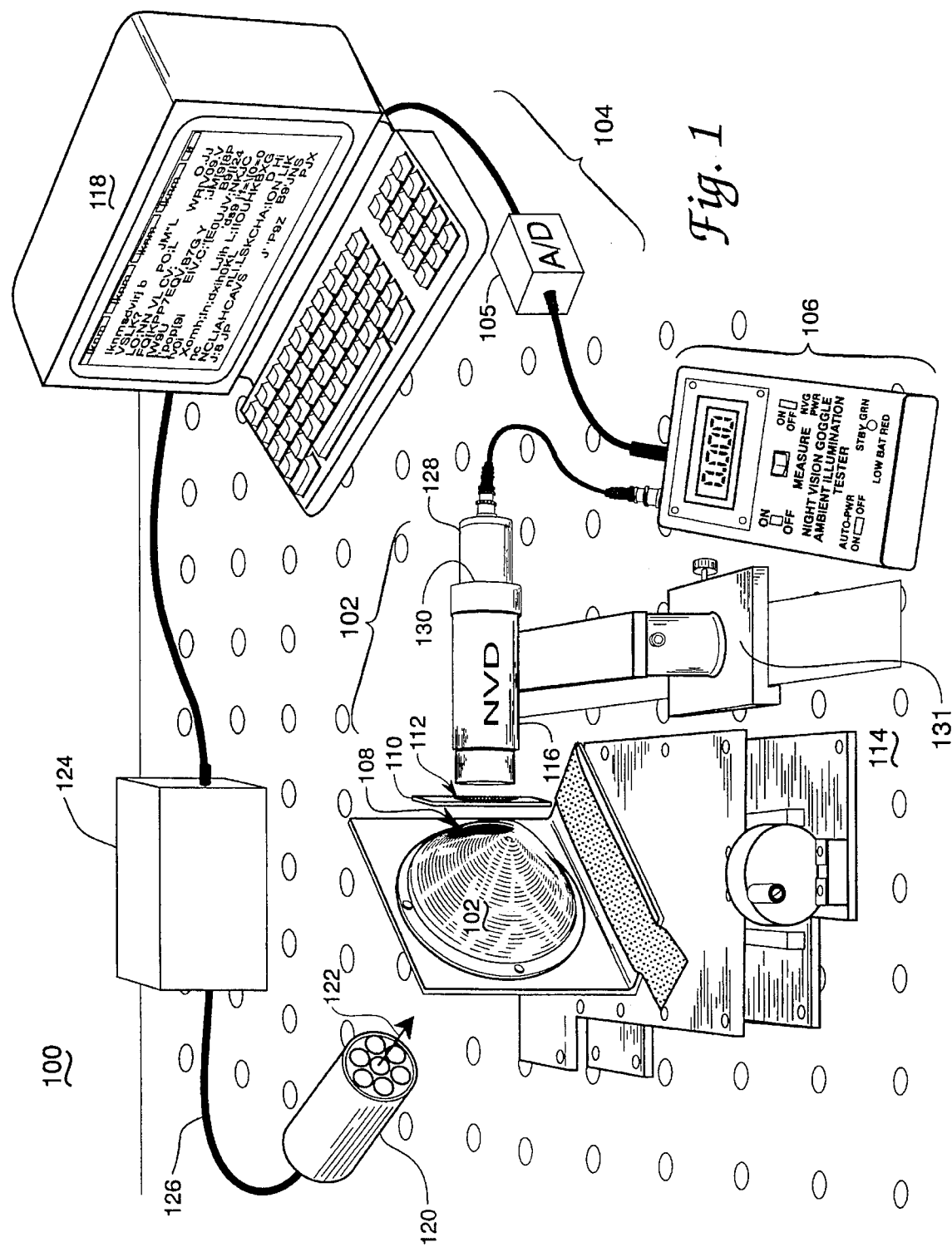
FIG. 1 shows an overall view of apparatus which may be used to embody the present invention.

FIG. 6 shows a typical optical resolution target which may be employed in the FIG. 1 apparatus for some uses of the invention.

DETAILED DESCRIPTION

FIG. 1 in the drawings shows an overall perspective view of preferred embodiment apparatus for the present invention. In FIG. 1 there is shown a monocular night vision device 116 which is receiving optical input from a spectral energy distribution testing source that is generally indicated at 100. The night vision device 116 is shown in FIG. 1 to be coupled to a readout apparatus which is generally indicated at 104. This readout apparatus includes the photometer-like system comprised of the transducer and enclosure 128, the measurement apparatus indicated at 106, the analog to digital converter 105 and a portion of the function provided by the computer 118. As is explained in some detail in the subsequent parts of this specification, the readout apparatus 104 including the computer 118 is actually an optional part of the FIG. 1 apparatus.

The night vision device under test in the FIG. 1 apparatus, the night vision device 116, is shown to be coupled to this output measurement system or readout apparatus because of certain accuracy and convenience advantages which result from the use of this system. A system suitable for accomplishing this night vision device output measurement function is moreover disclosed in U.S. Pat. No. 5,070,239, issued to one of the inventors named herein; this patent is hereby incorporated by reference herein. For many contemplated uses of the present invention however, this output measurement system or readout apparatus 104 may be replaced by an evaluation accomplished by the eye of a human observer-operator.

Several additional parts of the invention's preferred embodiment also appear in the FIG. 1 drawing, these parts include a housing 124 for the electrical circuit used to interface the transducer array or light emitting diode array 120 with an output port of the computer 118 or with other controller apparatus, a spherical diffusion or integrating member 102 used to diffuse or integrate the optical energy received by the night vision device 116, and the transducer array or light emitting diode array 120 used to supply night vision device input port illumination. (This transducer array or light emitting diode array 120 is intended for mounting within or adjacent the spherical diffusion or integrating member 102 as is indicated by the arrow 122.) Additional details regarding the transducer array or light emitting diode array 120 are provided below in connection with FIG. 3 and FIG. 4 of the drawings. Also appearing in the FIG. 1 drawing is the conductor path 126 used to convey signals to the transducer array or light emitting diode array 120, the enclosure 128 for the input transducer of the measurement apparatus 106 and the enclosure 130 for a fiber optic bundle used to size-adjust and convey optical signals from the night vision device 116 to the transducer in the enclosure 128.

The FIG. 1 drawing also shows at 108 the optical energy output aperture of the spherical diffusion or integrating member 102, a neutral density filter 112 which may be desirable for adjusting the intensity or radiance of the integrated optical output signal of the spherical diffusion or integrating member 102 to a level appropriate for the night vision device 116, and a mask 110 which may be desired to obscure external portions of the spherical diffusion or integrating member 102 from view by the night vision device 116. The FIG. 1 apparatus is shown to be mounted on an optical bench 114 with the aid of an optical frame assembly 131; such a mounting arrangement is in keeping with one of the intended uses of the invention as a test apparatus enabling realistic spectral energy distribution evaluation of a night vision device in a laboratory setting.

The FIG. 1 embodiment of the invention therefore utilizes multiple, independently controlled, narrow-band light sources in the transducer array or light emitting diode array 120 to reconstruct the spectral characteristics of night vision device-viewable objects and scenes. The function of the transducer array or light emitting diode array 120 is therefore to provide a variable wavelength and variable radiance source of spectral energy distribution-testing optical energy. Light emitting diodes, the preferred transducer elements in the transducer array or light emitting diode array 120, emit narrow-band light of approximately 50 nanometers of wavelength bandwidth and are available, off-the-shelf, in a range of dominant, or peak radiance output, wavelengths.

A representative subset of wavelengths, of for example wavelength separations of 25 nanometers, is desirably selected for emitting elements for the transducer array or light emitting diode array 120 in full spectrum arrangements of the invention. In addition small diameter wavelength filters are represented at 210 and 212 in the exploded representation of light emitting diode enclosures 218 and 220 in FIG. 2. These filters may be incorporated in the FIG. 1 embodiment of the invention to further tailor individual LED spectral characteristics. A similar filter arrangement is shown in FIG. 9 of my copending application for Letters Patent of the United States of America, the application titled "Night Vision Device Wavelength Test Pattern", Ser. No. 08/500,302, which is hereby incorporated by reference herein. A mosaic of numerous LEDs representing wavelengths ranging from the visible region of the electromagnetic spectrum, i.e., from for example 390 nanometers through the 1200 nanometers near-infrared portion of the spectrum, is preferably used in the full spectrum FIG. 1 transducer array or light emitting diode array 120.

Figure 2:
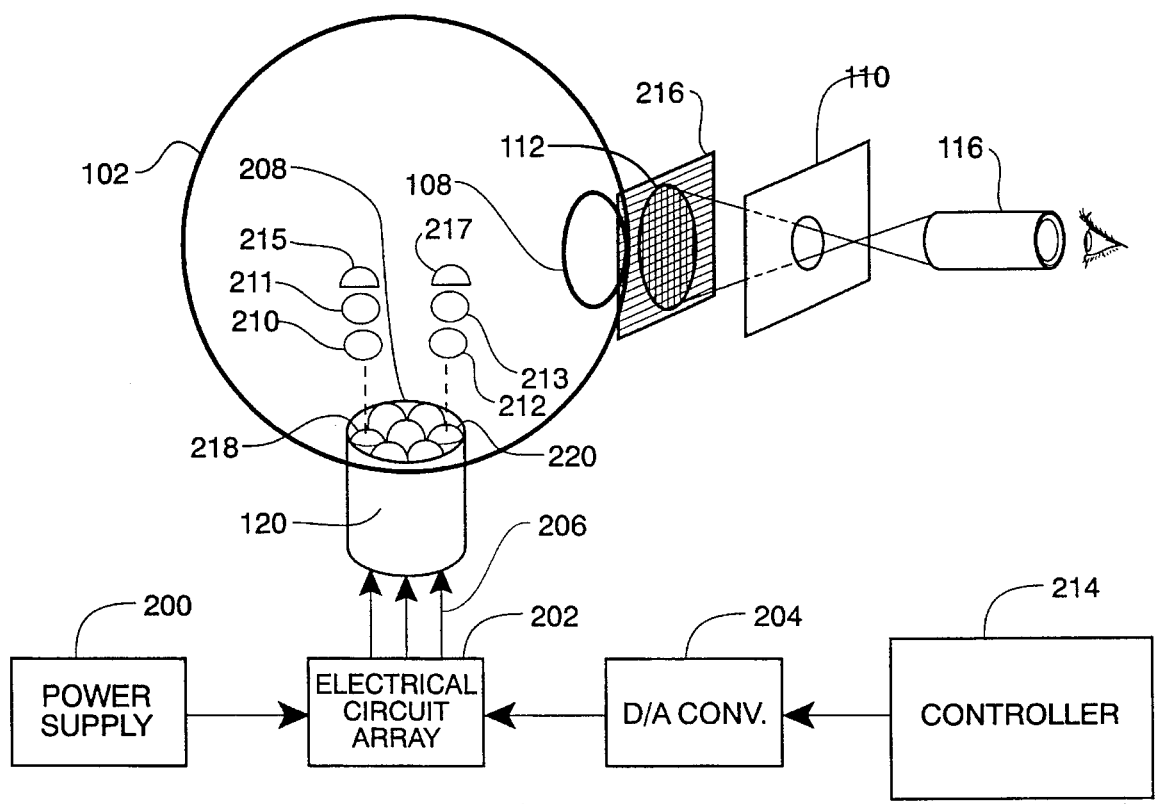
FIG. 2 shows a functional block diagram of apparatus of the FIG. 1 type which may be used to embody the present invention.

FIG. 2 in the drawings shows a functional block diagram of the FIG. 1 Spectral Distribution Emulator apparatus. The legend numbers in the FIG. 2 drawing are taken from the 200 series in order to indicate the drawing referred-to by later references to these legend numbers. It should be noted that new numbers are assigned to some of the elements described in FIG. 1 as a result of this practice and also in consideration of the fact that FIG. 1 is primarily an overall physical representation of the preferred embodiment of the invention while FIG. 2 is primarily a functional block diagram, i.e., FIG. 1 and FIG. 2 can be said to disclose differing structural and functional aspects of the included elements.

The FIG. 2 drawing therefore shows several of the FIG. 1 elements and certain additional elements of a preferred embodiment of the invention in block diagram form. In the FIG. 2 drawing the spherical diffusion or integrating member 102 is repeated using its FIG. 1 legend number as is the transducer array or light emitting diode array 120, the optical energy output aperture 108, the mask 110 the night vision device 116 and the neutral density filter 112. The other elements shown in FIG. 2 are considered to be either not shown in FIG. 1 or to be functional representations of FIG. 1 elements which therefore receive new legend numbers. In the FIG. 2 drawing the transducer array or light emitting diode array 120 is shown to be driven by an array of electrical circuits 202 via a plurality of electrically conductive paths 206. Energy for operating the transducer array or light emitting diode array 120 elements and the array of electrical circuits 202 is supplied by a power supply 200. Non exploded individual elements of the transducer array or light emitting diode array 120 are represented typically at 208 in the FIG. 2 drawing; these elements are preferably in the form of light emitting diode elements of a certain spectral wavelength relationship as is described elsewhere herein.

Information for controlling the array of electrical circuits 202 circuits is provided by a controller 214 which may be the computer 118 of FIG. 1 or some other controller arrangement. A digital to analog converter 204 is used to couple the digital signals from an output port of the controller 214-computer 118 to the array of electrical circuits 202 if needed. The array of electrical circuits 202 described subsequently herein in connection with FIG. 4 may be arranged to operate without the use of this digital to analog converter however.

The FIG. 2 drawing also shows the disposition of a spatial test pattern 216 in the optical path intermediate the spherical diffusion or integrating member 102 and the night vision device 116. This spatial test pattern 216 may be disposed in a coplanar relationship with the neutral density filter 112 and may be employed during certain spatial resolution measurements of the night vision device 116 characteristics as described below. This spatial test pattern may also be useful in instances wherein the output of the night vision device 116 (which results from use of the simple basic form of the spectral energy distribution test signals) is to be viewed by a human observer. Without such a test pattern the night vision device output for the present apparatus is free of discernible features and therefore not easily evaluated or compared by a human observer. A spatial resolution test pattern suitable for use at 216 in FIG. 2 is shown in FIG. 6 of the drawings. This FIG. 6 pattern is a standard type 1951 resolution pattern used by the United States Air Force and others for photographic image resolution measurements and related purposes additional details regarding this pattern appear below herein.

The wavelength filters 210 and 212 in the output path of the light emitting diode energy sources may be joined by neutral density optical filters 211 and 213, which also appear in the exploded view of FIG. 2, in order to adjust the radiance output of individual elements of the transducer array or light emitting diode array 120. Such adjustment achieves an individual array element output level appropriate for integration into a composite output signal of the transducer array or light emitting diode array 120. These neutral density filters can for example, be arranged to adjust particular light emitting diode output level to achieve intensity compatibility with the output of other light emitting diode elements. In conjunction with the neutral density filter 112, the neutral density filters 211 and 213 may also be used to adjust the output level of the composite signal generated in the spherical diffusion or integrating member 102 to be compatible with the input characteristics of the night vision device 116. The lens-like cap portion of the exploded-view light emitting diode enclosures 218 and 220 in FIG. 2 appear at 215 and 217 in the FIG. 2 drawing.

Figure 3:
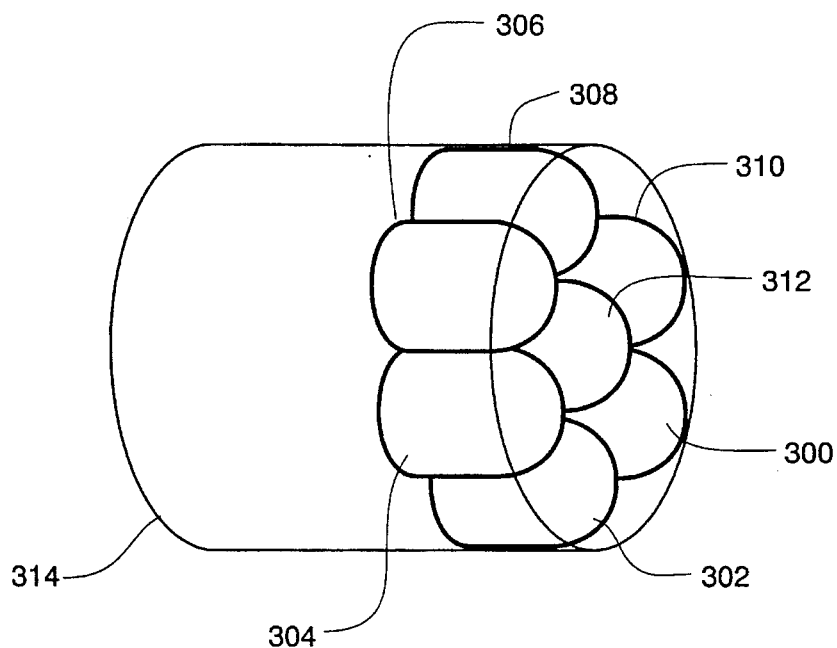
FIG. 3 shows a transducer array in the form of a light emitting diode mosaic bundle assembly which may be used in the FIG. 1 and FIG. 2 embodiments of the invention.

FIG. 3 in the drawings shows a preferred arrangement for incorporating light emitting diode enclosures into the transducer array or light emitting diode array 120. In FIG. 3 there is represented a collection of seven such enclosure elements, which are identified with the legend numbers 300, 302, 304, 306, 308, 310, and 312, and are disposed in a close physical proximity array. These elements are carried on a substrate member 314 where they may be attached and formed into a unitary structure by conventional techniques such as adhesive bonding or molding or other fabrication arrangements as are known in the art. In contrast to the early days of light emitting diode usage when a user could design equipment to employ any output color from an light emitting diode device, so long as it was red or green, light emitting diodes having the herein described 25 nanometers of output wavelength separation or other relatively small values of wavelength separation are now available from a number of suppliers. One such supplier is currently Stanley Electric Company of Irvine, Calif.

Light emitting diode elements such as are preferred for use in the FIG. 3 array tend to emit light or radiant energy of a narrow bandwidth character, a bandwidth of about 50 nanometers of wavelength. On the other hand, in order to cover the herein described spectral range of 390 to 1200 nanometers of wavelength the seven light emitting diode elements in FIG. 3 must have peak radiance wavelength values which are separated by increments of about (1200–390)/7 or about 115 nanometers. In view of these relationships therefore light emitting diode elements of the normal 50 nanometers bandwidth result in spectral gaps between the output of spectrally-adjacent light emitting diode elements in the FIG. 3 array. Clearly different arrangements of these parameters are possible and are desirable in certain embodiments of the invention. To eliminate these spectral gaps for example the FIG. 3 array may be increased in light emitting diode content to contain the 32 or 33 diodes required to achieve the 390–1200 nanometers wavelength range with 25 nanometer increment spacings. Alternately, the wavelength range to be considered may be reduced from this 390–1200 nanometers range or transducer elements of wider bandwidth employed in the array. Other arrangements may also be used as will appear to persons skilled in the electromagnetic and related arts.

The radiance output range of each individual element in the FIG. 3 array (as a function of supplied current) is preferably known in advance through measurement by a National Institute for Science & Technology (NIST) traceable radiometer. The measured radiance value may be stored in the memory of computer 118 or by other storage arrangements. The wavelength filter 210 and 212 and the neutral density filters 211 and 213 of FIG. 2 may be used in obtaining the desired radiance range in the FIG. 3 array. Using a lookup table of calibration values, a computer program or some other algorithm determination for the FIG. 1–FIG. 3 apparatus may be used to set individual LED radiances at different levels to reconstruct the SED of a specific object or scene. The flow diagram of FIG. 5 in the drawings indicates such control in the block 510 for example.

Returning in summary to the FIG. 1 and FIG. 2 drawings, integrated light emitting diode energy leaves the spherical diffusion or integrating member 102 via the optical energy output aperture 108 shown in both FIG. 1 and FIG. 2. A neutral density filter 112 may be needed at this output aperture 108 to obtain proper radiance levels. The spherical diffusion or integrating member 102 is desirably hidden from view by the night vision device 116 by a mask element 110. The night vision device 116 is aimed and focused on a test spot of the spherical diffusion or integrating member 102 for the spectral energy distribution test.

FIG. 4 in the drawings shows an operational amplifier-based electrical circuit which may be used to energize and control individual light emitting diode elements of the FIG. 1, FIG. 2, and FIG. 3 array. The FIG. 4 circuit may be used with either a manual or a computer controlled arrangement of the invention however it is especially helpful in achieving a computer interface with the array elements. In the FIG. 4 circuit an operational amplifier 402 drives an NPN transistor 408 in a feedback-surrounded constant current generating circuit arrangement. The energized light emitting diode element appears at 404 in the collector circuit of the NPN transistor 408 and current flow in this light emitting diode is enabled or turned ON/OFF by a shunting PNP transistor 406. The magnitude of the current flow in the light emitting diode 404 is determined by a current feedback signal flowing along the path 428 to the inverting input port 414 (i.e., the summing node terminal 424) of the operational amplifier 402; this current magnitude is adjusted by means of the potentiometer 410 and may be additionally controlled in both magnitude and presence or absence by a signal received at the terminal 426, a signal which may originate in a manual controller or a controlling computer. Both this current controlling signal and the control signal for the current diverting transistor 406 may require signal level conversion as is known in the electrical circuit art in order to achieve a convenient controller-computer interface.

The non inverting input port of the operational amplifier 402 is shown at 416 and may be connected to the negative power supply terminal or to the indicated common ground which connects to the negative supply terminal. This non inverting input terminal 416 may also be used as a light emitting diode intensity or radiance control, or an ON/OFF control for the connected light emitting diode with the use of suitable circuit modifications as are known in the art. Positive supply connections for the operational amplifier 402 and the light emitting diode 404 are indicated at 422 and 418 in FIG. 4; a negative supply may also be needed for the operational amplifier 402 depending on the type of amplifier circuit (i.e., the integrated circuit chip type) employed. The inductance element at 412 in FIG. 4 provides signal decoupling and low frequency roll-off of the feedback signal flowing along the path 428. A plurality of the FIG. 4 circuits, depending on the number of light emitting diode elements used-as is explained below herein, are received in the housing 124 in the FIG. 1 drawing.

An alternate arrangement of the FIG. 4 circuit may be achieved by employing one of the terminals 424 and 426 as an input port for both the output current magnitude determining signal received from a computer (or from some other controller arrangement of the array of electrical circuits 202) and for input of the current ON/OFF control signal of terminal 420. In such arrangement of the circuit, the output current is essentially controlled down to zero magnitude during a light emitting diode OFF condition and controlled up to the selected magnitude for a light emitting diode ON condition and the transistor 406 is eliminated. This control arrangement is characterized by ON-OFF transition rate characteristics of the amplifier circuit used at 402 as is also known in the art. Level adjustment of the signal applied at terminal 426 for this dual purpose may also be needed depending on the computer used, digital signal levels employed and other considerations.

The circuit of FIG. 4 may be used to drive each light emitting diode element of the FIG. 3 array with a separate circuit being used with each element. In instances wherein the FIG. 3 array is enlarged or otherwise arranged to include plural light emitting diode elements of the same output wavelength, the FIG. 4 circuit may be used to drive each group of the same wavelength for example so long as the required voltage or current levels are within its capability and any differences in radiance level among these commonly driven elements can be accommodated. The FIG. 4 driver circuit may also be used to drive non common spectrum wavelength array elements for example. This common drive arrangement can occur in a time segregated manner through use of the transistor 406 to maintain all except the desired elements in the disabled condition. Other driver circuits are of course within the spirit of the invention.

Figure 5:
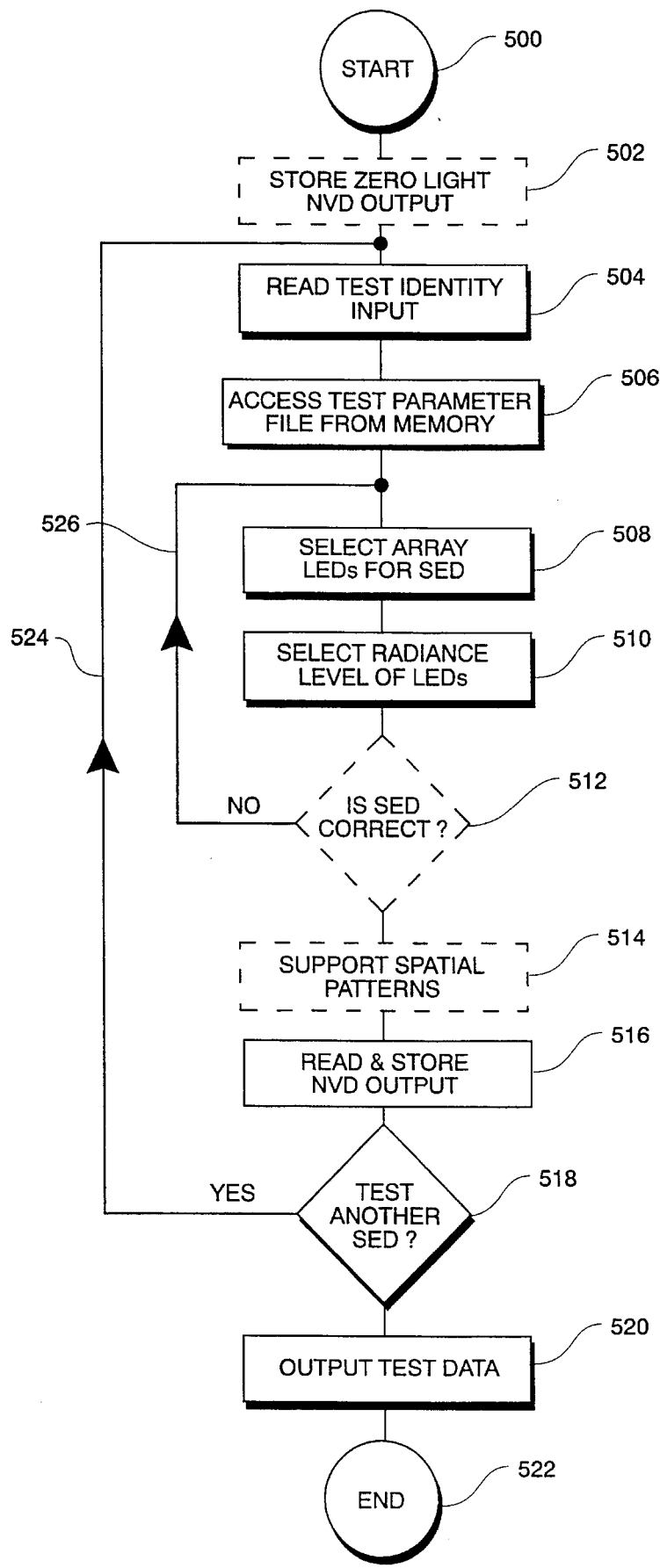

FIG. 5 in the drawings shows a flow diagram for software which may be used in the computer 118 or the controller 214 of the described embodiment of the invention. This software enables use of a personal computer for example and also can enable use of a dedicated hardware or programmed logic array for accomplishing the control and memory functions in the described realization of the invention. When used with a computer, the selected computer may be embodied as a personal computer of many possible varieties, a computer which is based on the currently popular Intel® 386 or 486 central processor chips is for example more than adequate for this use.

The FIG. 5 flow diagram discloses salient aspects of the functions to be accomplished for example in the software of a computer used with the FIG. 1 and FIG. 2 apparatus, functions relating to the spectral energy distribution test functions of the invention. Although some decisions, loops and storage related computer functions appear, at blocks 512, 518; 524, 526; and 506, 516 respectively for example in the FIG. 5 flow diagram, additional software related functions are doubtless required by a particular computer language selected for embodying the FIG. 5 flow sequence.

In the FIG. 5 flow diagram after starting the flow in block 500, the night vision device under test is measured for its zero light input or noise output in block 502. In invention arrangements wherein a human eye evaluation of the night vision device output is used in lieu of the readout apparatus 104, this block 502 step may comprise simply a noting of normal or unusually large dark input or noise related output from the night vision device. In invention arrangements wherein the readout apparatus 104 apparatus is used, this block 502 step provides a noise level signal which is to be subtracted from the illuminated output level of the night vision device under test to determine an effective signal level. Since a single performance of this noise background measurement suffices for each night vision device tested, the block 502 measurement is excluded from the repetition of loops 524 and 526 in the FIG. 5 flow. The block 502 step in the FIG. 5 flow is shown in dotted block form as an indication of this step being of a human-performed or optional nature in some tests performed with the invention.

Once the inputting of test selection data and the accessing of testing parameters i.e., inputting of light emitting diode element selection and light emitting diode radiance or intensity values, is achieved in the blocks 504 and 506, the actual enablement of light emitting diode elements for use in a test and the setting of their operating radiance level to achieve the desired spectral energy distribution in the test is accomplished in the blocks 508 and 510 of FIG. 5. Verification of these settings by way of a signal feedback path from the output of the light emitting diode elements to the computer 118 for example, a path not shown in the drawings, is indicated in the block 512, a block which is also shown in dotted form in FIG. 5 to indicate its optional nature. Incorrect spectral energy distribution parameters, as may result from light emitting diode element aging or obscuration by dust or dirt for example, are corrected by the path 526 looping in the FIG. 5 sequence. Parenthetically it may be acknowledged that an accessing of the test parameters, as called-for in the block 506 of FIG. 5, can be interpreted to imply that these parameters are stored in the memory of the computer 118 or the controller 214 in FIG. 1 and FIG. 2 respectively. Actually this and additional other storage locations for the test parameters are contemplated to be within the spirit of the invention. The test parameter selection of block 506 may be regarded as the selection of individual test parameters from a library of such parameters stored in computer or controller or other memory.

In instances wherein the spectral energy distribution test is concerned also with resolution capabilities of the tested night vision device, or in instances wherein a night vision device output image other than the featureless green field of the spectral energy distribution light emitting diode elements input is desired, a set of spatial resolution patterns may be imposed on the night vision device optical input signal, a set of patterns as is represented at 216 in FIG. 2 and as is accomplished by the additionally optional block 514 in FIG. 5. One spatial resolution pattern which may be used in performing the block 514 function was referred-to above as commonly used by the United States Air Force and others, used in fact for aerial photography equipment evaluation and related purposes. A representation of this pattern appears in FIG. 6 herein. The FIG. 6 pattern is identified as the United States Air Force 1951 Tri-Bar target.

This FIG. 6 Tri-Bar target is divided into seven groups of six elements. Each spatial frequency is represented in the target by a three-bar pattern oriented vertically and a three-bar pattern oriented horizontally. The resolution of a night vision device is determined with the FIG. 6 target by determining the smallest tri-bar pattern that can be resolved into its three bars. This limiting resolution is then specified in terms of the group and element of the "just resolvable" tri-bar. Another and somewhat related resolution test pattern which is specifically intended for night vision device testing is disclosed in the U.S. Pat. No. 4,607,923, issued to inventors common to the present patent document. This test pattern may also be used as spatial test pattern 216 in the FIG. 2 embodiment of the invention. The contents of the U.S. Pat. No. 4,607,923 patent are hereby incorporated by reference herein.

Reading and storage of the night vision device output level in response to the selected wavelengths of the spectral energy distribution input is accomplished in block 518 of FIG. 5, this reading being preferably accomplished with the readout apparatus 104. Repetition of the test sequence for another set of spectral energy distribution wavelengths is provided for by the FIG. 5 decision of block 518 and the looping path 524. Repetitions of this type are desirable in instances wherein the tested night vision device is to be subjected to a wide range of spectral energy distribution wavelength combinations in its use environment and a duplication of this environment is desired in the present test. Such a wide range of spectral energy distribution wavelength exposures may also be accomplished on a parallel test basis using the invention by increasing the number of elements in the FIG. 1 FIG. 2 and FIG. 3 light emitting diode array within practical limits; however the FIG. 5 indicated serial testing of additional spectral energy distributions is believed preferable.

Outputting of the test data and ending of the spectral energy distribution test are indicated by the blocks 520 and 522 in FIG. 5 sequence. Data outputting may be accomplished through the use of printing, writing to a disc file, graphic display of results (on a screen or page) or by other arrangements known in the electronic data processing art. The data communicated in this manner includes the results of the block 502 initial test, the one or more test results measured during executions of the block 516 step, and of course whatever test identity, spectral range tested, operator identity, date, night vision device identification and other routine information is desired.

With the machine-accomplished control as disclosed in the FIG. 5 drawing or alternately with manually accomplished control, the spectral energy distribution test presented to the night vision device can therefore be quickly changed to seek identification of particular night vision device deficiencies, this change can be conveniently achieved through the use of software routines and other computer-enabled expediencies. A detailed test sequence can for example be achieved through the use of repeatedly executed lines of code in a subroutine or with the entire test looping arrangement described in connection with FIG. 5 above when a computer is employed. When a computer is used in realizing the invention it may be arranged to also control light emitting diode element intensity or radiance in addition to the ON/OFF status of each array element. As is described earlier herein, the FIG. 4 array element control circuit is arranged in consideration of such computer and software input of both the ON/OFF function and radiance or intensity information.

The use of a digital computer as represented at computer 118 and controller 214 in the FIG. 1 and FIG. 2 drawings is therefore a helpful and convenience-increasing aspect of the present invention. The software code used with a computer inclusive embodiment of the invention, the software resident in the computer 118, is in addition, not complex in nature by present-day standards as is evidenced by the above FIG. 5 discussion. Such software may in fact be embodied without a significant degree of experimentation (conceivably in the form of one page of code or less, depending on the number of and the complexity of the tests accomplished) in most of the known software languages and by persons of ordinary or even beginning skill in the software art. The exact nature of such software will of course depend on considerations which include the night vision device tests to be performed and the rules of the software language selected. Significant portions of such software are also known in the computer art and are readily available as end-use items or for use as models in preparing custom tailored software. In reality moreover, the herein recited computer and software-inclusive embodiment of the invention is actually a matter of convenience and practicality and may also be replaced by the indicated dedicated hardware or some combination of dedicated hardware and elementary computer software or by programmed logic arrays or alternately by other arrangements as are known in the electrical art.

It is the intent of the invention therefore that the FIG. 1 through FIG. 4 components taken in combination provide for night vision device spectral energy distribution testing using a controllable sequence of spectrally narrow-band, i.e., limited wavelength range, infrared energy inclusive signals of known intensity or known radiance level as input to the receiving port of the night vision device 116. It is the further intent of the FIG. 1 through FIG. 4 apparatus to provide user controllable variation of several attributes of the test pattern presented to the night vision device.

The need for night vision device testing equipment and the nature of night vision device environment constraints which make night vision device characteristics important is described and shown graphically in a copending United States patent document, AF Invention application "Night Vision Device Automated Spectral Response Determination", Ser. No. 08/491,390 which includes names common with the present application as inventors. This application is also concerned with the subject of night vision device testing and spectral response determination in a night vision device. The contents of this co-pending patent application are hereby also incorporated by reference herein.

The present invention therefore offers speed, accuracy, and relative simplicity in a night vision device spectral energy distribution test apparatus. The invention provides a comprehensive evaluation of night vision equipment spectral energy distribution response that is suitable for laboratory and field use employment. The provided evaluation is indicative of commonly encountered night vision device environmental responses. The disclosed equipment can also be adapted to test night vision equipment of any configuration.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Night vision device spectral energy distribution response evaluation apparatus comprising the combination of:

a plurality of electrical to optical energy transducer devices disposed into a night vision device input port-illuminating first array;

said first array plurality of electrical to optical energy transducer devices including electrical to optical energy transducer devices of selected different optical energy output wavelengths;

a test signal generating, electrical to optical energy transducer device output signal-combining member disposed optically between said first array and an optical input port of said night vision device;

a second array comprised of electrical energy-controlling electronic circuits, each circuit being disposed in electrical energization-determining relationship with one of said electrical to optical energy transducer devices in said first array;

a test signal controlling member connected with each of said electrical energy-controlling electronic circuits for determining an instantaneous electrical current conducting operational status thereof and for selecting successive optical test signals applied to said night vision device input port.

2. The apparatus of claim 1 wherein said electrical to optical energy transducer devices comprise light emitting diodes of incremented wavelength spectral separation.

3. The apparatus of claim 2 wherein said electrical to optical energy transducer devices include light emitting diodes having spectral outputs separated by selected equal wavelength increments.

4. The apparatus of claim 2 wherein said electrical to optical energy transducer devices light emitting diodes have spectral outputs extending between the visible and near infrared ranges of optical energy wavelength.

5. The apparatus of claim 1 wherein said second array electrical energy-controlling electronic circuits include electrical current magnitude-controlling and electrical current commencement and termination-controlling electrical circuits.

6. The apparatus of claim 1 wherein said test signal controlling member consists of one of a manually controllable selection apparatus, an electronic circuit-comprised controller apparatus and a digital computer apparatus.

7. The apparatus of claim 1 wherein said test signal generating, electrical to optical energy transducer device output signal-combining member comprises a spherical optical integration element.

8. The apparatus of claim 1 wherein said second array of electrical energy-controlling electronic circuits includes a plurality of operational amplifier circuits each connected with one of said first array plurality of electrical to optical energy transducer devices.

9. The apparatus of claim 1 wherein said test signal controlling member includes a library of different spectral energy distribution-determining data arrays, each determinative of an energization combination in said electrical to optical energy transducer devices first array.

10. The apparatus of claim 1 wherein said first array of electrical to optical energy transducer devices includes one of a wavelength selective optical filter and a neutral density optical filter for selected of said transducer devices.

11. The apparatus of claim 1 further including a spatial test pattern member located in an optical path intermediate said test signal generating electrical to optical energy transducer device output signal-combining member and said night vision device input port.

12. The method of verifying spectral energy distribution-determined performance of a night vision device comprising the steps of:

forming an array of electrical energy to optical energy transducer elements comprising elements within an input spectral energy distribution band of said night vision device;

generating a night vision device test input signal with energized of said array of electrical energy to optical energy transducer elements, said test input signal including optical energy from array-included transducer elements of selected optical energy output wavelength and radiance level;

controlling wavelength of said test input signal and radiance level of said test input signal by electrically determining one of an illuminated state and a quiescent state for, and an electrical energization level of, each electrical to optical energy transducer element in said array;

exposing an optical input port of said night vision device to said test input signal from said array of electrical energy to optical energy transducer elements;

comparing an output signal of said night vision device, in response to said test input signal, with an expected night vision device output signal for said spectral energy distribution input.

13. The method of claim 12 wherein said array elements comprise light emitting diodes of differing, and successively longer peak radiance wavelength output characteristic.

14. The method of claim 13 wherein said array of electrical energy to optical energy transducer light emitting diodes comprises light emitting diodes of incrementally segregated spectral wavelengths located in the visible and near infrared wavelength electromagnetic spectral regions.

15. The method of claim 12 wherein said controlling step includes initiating, terminating, and limiting an electrical current magnitude, in a flow of electrical energy into each said array element using a solid state electrical control circuit.

16. The method of claim 12 further including the step of combining an output signal from each energized of said array transducer elements into a composite input signal of said night vision device in a spherical diffusing element.

17. Night vision device target spectral energy distribution emulation apparatus comprising the combination of:

means, including a plurality of wavelength-segregated electrical to optical energy transducer elements, for illuminating an input port of a night vision device under test;

said wavelength-segregated electrical to optical energy transducer elements including transducer elements of segregated dominant output wavelengths dispersed incrementally across a selected portion of an input bandpass characteristic of said night vision device input port;

means including an optical energy diffusion spherical member for integrating output optical energy of said plurality of electrical to optical energy transducer elements into a composite optical signal received at said input port of said night vision device;

electrical energy control means, including a plurality of electrical energy-controlling circuits each disposed in electrical energization determining relationship with one of said electrical to optical energy transducer elements, for determining an OFF, ON, and operating intensity status of each of said electrical to optical energy transducer elements in said plurality during generation of each night vision device input port-received composite optical output signal;

output signal selection means connected with each of said electrical energy-controlling circuits for determining spectral content of each successive composite optical output signal presented to said input port of said night vision device.

18. The apparatus of claim 17 wherein said means for evaluating an output response of said night vision device includes means for sensing absence, presence and magnitude of output image elements generated in response to each electrical to optical energy transducer element of said means including a plurality of wavelength-segregated electrical to optical energy transducer elements for illuminating an input port of a night vision device under test.

19. The apparatus of claim 17 wherein said output signal selection means includes a manually operable controlling member.

20. The apparatus of claim 17 wherein said plurality of electrical energy-controlling circuits are electronic circuits and wherein said output signal selection means includes a digital computer connected with said electronic circuits.

* * * * *